L. E. COWEY.
SOUND WARNING HORN.
APPLICATION FILED MAR. 31, 1920.
1,370,787.
Patented Mar. 8, 1921.
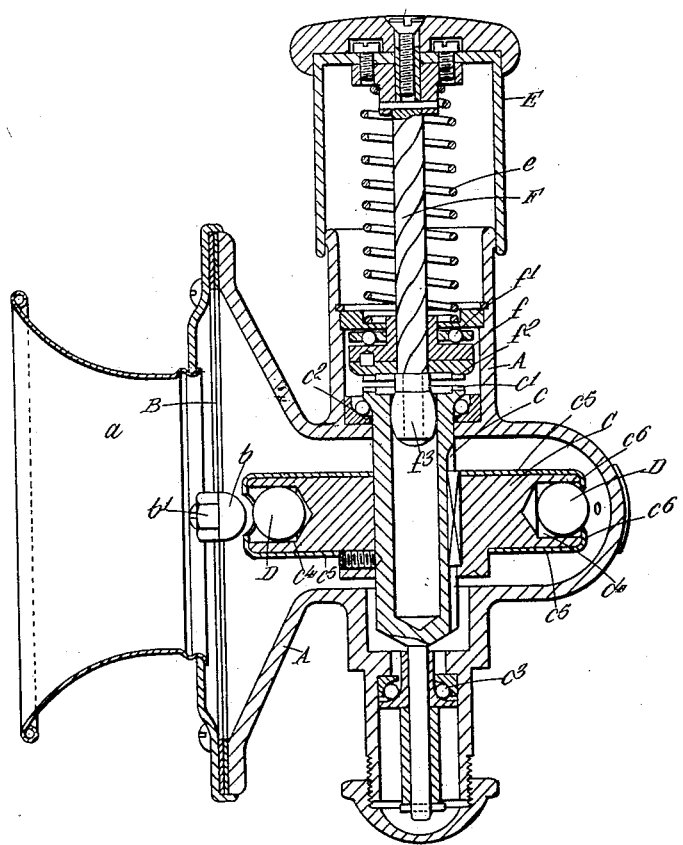

UNITED STATES PATENT OFFICE.

LEONARD EUGENE COWEY, OF KEW GARDENS, ENGLAND.

SOUND WARNING-HORN.

1,370,787. Specification of Letters Patent. Patented Mar. 8, 1921.

Application filed March 31, 1920. Serial No. 370,205.

*To all whom it may concern:*

Be it known that I, LEONARD EUGENE COWEY, a subject of the King of Great Britain, residing at Archer Works, Station avenue, Kew Gardens, in the county of Surrey, England, have invented certain new and useful Improvements in Sound Warning-Horns, of which the following is a specification.

This invention relates to sound warning devices, such as motor horns, of the type in which a diaphragm is vibrated by a rotating striking member operated by a quick pitch screw and nut device through a one-way clutch.

According to this invention the rotating striking member is provided with a hollow spindle adapted to receive the end of the quick pitch screw when the latter is pressed in for sounding purposes, the outer end of the said spindle forming one member of a clutch the other member of which is carried upon a nut mounted on the quick pitch screw so that on pressing in the screw the nut engages the end of the spindle and rotates it. The striking device may be in the form of a wheel set transversely to the diaphragm and carrying at its periphery a set of balls adapted to be driven radially outward by centrifugal force and to strike a stud on the diaphragm as they pass.

In order that the said invention may be clearly understood and readily carried into effect, the same will now be described more fully with reference to the accompanying drawing which shows in vertical section a motor horn embodying this invention.

A is the body of the horn provided at the front with the mouthpiece $a$. Behind the mouthpiece is the diaphragm B, having a striking stub $b$ mounted on its inner face at the center by means of a nut $b'$. C is the wheel carrying the striking balls D and mounted upon the hollow spindle $c$. E is the striking cap fitted to slide upon the upper end of the body A and to compress the spring $e$ when struck or pressed, the spring returning the cap to normal position on release. F is an operating screw of large pitch working in the rotatable nut $f$ which is supported by the ball thrust bearing $f'$ in the casing A and provided with clutch teeth $f^2$ which are adapted to engage with corresponding teeth $c'$ on the upper end of the hollow spindle $c$, which spindle is supported between the ball bearings $c^2$, $c^3$.

To give a warning sound the cap E is struck or pressed with a force which depends upon the intensity of the sound desired, moving down against the pressure of the spring $e$. The screw F moves down with the cap and its lower end $f^3$ is guided in the hollow spindle $c$. The initial movement carries down the clutch nut $f$ which immediately engages the upper end of the hollow spindle $c$ through the clutch teeth. The continued stroke of the screw E causes rotation of the nut, the downward movement of which is stopped, and consequently the engaged spindle $c$ and wheel C are rotated with a speed depending on the rate at which the cap and screw descend.

The mass of the parts is sufficient to produce substantial momentum which carries on the rotation for a short time after the cap is released. The balls D are in pockets $c^4$ of the wheel C and are retained in place by the covers $c^5$ on the wheel, which covers are provided with a lip $c^6$ beyond which the outer ends of the balls can project. The rotation of the wheel C causes the balls to be thrown outwardly by centrifugal force, the force varying according to the speed of rotation, and the balls are then able to strike the stud $b$ as they pass. The force with which they strike as well as the number of blows struck per second depends upon the speed of rotation and any required intensity of sound can be produced by regulating the strength of the stroke. When the striking cap is released its spring at once raises it, the upward movement of the screw lifting the nut $f$ out of engagement with the spindle $c$ and leaving the spindle and wheel free to rotate with the impulse given. A continuous warning sound of variable intensity can thus be given by a rapid succession of strokes.

What I claim and desire to secure by Letters Patent of the United States is:—

1. In a sound warning device of the diaphragm type, the combination of a casing having a diaphragm mounted thereon, a hollow housing extending laterally from said casing in one direction and having a bearing therein, a hollow housing extending from said casing in the opposite direction and having a bearing therein, a hollow spindle traversing said casing and supported by said bearings, a rotatable striking member mounted on said spindle, a clutch nut mounted in said first named housing above said spindle, a quick pitch sliding operating screw traversing said nut and reciprocable in said hollow spindle, a striking cap having a hollow depending skirt telescoping said first named housing to which said spindle is secured, and a spring interposed between said cap and nut about said spindle and housed within said telescoping casing.

2. In a sound warning device of the diaphragm type, the combination of a casing having a substantially annular body portion, a diaphragm mounted on said casing, an integral housing projecting from one side of said casing and having a bearing mounted therein, an integral housing projecting from the opposite side of said casing and having a bearing therein, a hollow spindle mounted for rotation in said bearings, a rotatable striking member removably mounted on said spindle, a rotatable clutch nut mounted in said housing and adapted to engage said spindle, a quick pitch sliding operating screw traversing said nut and reciprocable in said hollow spindle and having an anti-friction bearing member at its lower end, means for limiting the upward movement of said clutch nut in said housing, a striking cap secured to the upper end of said screw, a skirt depending from said cap and telescoping said housing, and a spring interposed between said cap and said nut limiting means and housed within said telescoping members.

3. In a sound warning device of the diaphragm type, the combination of a substantially annular flat body portion having a flaring diaphragm support extending from one side thereof, a diaphragm mounted on said flaring support, an integral housing projecting from the top wall of said body portion and having a bearing therein, an integral housing projecting from the bottom wall of said body portion and having a bearing therein, a hollow spindle mounted in said bearings, a striker member mounted on said hollow spindle and rotatable within said annular body portion with its edge projecting into the flaring diaphragm support, a clutch nut mounted in said first named housing above said spindle, a stop plate to limit upward movement of said nut in said housing, a quick pitch sliding operating screw traversing said plate and nut and reciprocable in said hollow spindle, an anti-friction bearing member at the lower end of said screw, a striker cap secured to the upper end of said spindle, a skirt depending from said cap and telescoping with said first named housing, and a lifting spring between said cap and stop plate surrounding said spindle and housed within said telescoping cap and housings.

LEONARD EUGENE COWEY.